United States Patent
Han et al.

(10) Patent No.: US 9,876,406 B2
(45) Date of Patent: Jan. 23, 2018

(54) STATOR WINDING PATTERN FOR HAIRPIN DRIVE MOTOR

(71) Applicant: Hyundai Motor Company, Seoul (KR)

(72) Inventors: Dongyeon Han, Seoul (KR); Myung Kyu Jeong, Seoul (KR); Young Jin Seo, Gyeonggi-do (KR); Hyoungjun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 309 days.

(21) Appl. No.: 14/871,216

(22) Filed: Sep. 30, 2015

(65) Prior Publication Data
US 2016/0164360 A1   Jun. 9, 2016

(30) Foreign Application Priority Data
Dec. 3, 2014 (KR) .................. 10-2014-0172123

(51) Int. Cl.
*H02K 3/28* (2006.01)
*H02K 3/12* (2006.01)

(52) U.S. Cl.
CPC .............. *H02K 3/28* (2013.01); *H02K 3/12* (2013.01)

(58) Field of Classification Search
CPC ................... H02K 3/12; H02K 3/28
See application file for complete search history.

(56) References Cited

U.S. PATENT DOCUMENTS

| 6,137,201 A * | 10/2000 | Umeda | H02K 1/165 310/179 |
| 6,201,332 B1 * | 3/2001 | Umeda | H02K 3/12 310/179 |
| 6,750,582 B1 * | 6/2004 | Neet | H02K 3/12 310/201 |
| 6,894,417 B2 * | 5/2005 | Cai | H02K 3/12 310/184 |

(Continued)

FOREIGN PATENT DOCUMENTS

| KR | 10-2013-0038269 A | 4/2013 |
| KR | 10-2014-0089017 A | 7/2014 |

(Continued)

OTHER PUBLICATIONS

European Search Report for European Patent Application No. 15188648.8, dated Jun. 28, 2016, 9 pages.

*Primary Examiner* — Mohamad Musleh
(74) *Attorney, Agent, or Firm* — Mintz Levin Cohn Ferris Glovsky and Popeo, P.C.; Peter F. Corless

(57) ABSTRACT

A stator winding pattern of a hairpin drive motor includes a stator with 8 poles and 48 slots of a distribution winding where a hairpin-type of flat coil is inserted into a slot of a stator core and configured by a full pitch winding implementing 6 pitches of 3 phases and 2 in parallel, the pitch being a distance between adjacent slots, characterized in that: first to fourth layers are formed in the slot of the stator core in a radial direction of the stator core; and when a first layer or a fourth layer is set as a draw out part of one phase in an optional reference slot, a first draw out of a different (Continued)

phase is formed in a draw out slot having 16 pitches in a slot forward direction in a same layer based on the reference slot, and a second draw out of the different phase is formed in a draw out slot having 32 pitches in the slot forward direction in the same layer based on the reference slot.

6 Claims, 4 Drawing Sheets

(56) References Cited

U.S. PATENT DOCUMENTS

| | | | |
|---|---|---|---|
| 6,979,926 B2* | 12/2005 | Ogawa | H02K 3/12 |
| | | | 310/179 |
| 2007/0018525 A1* | 1/2007 | Cai | H02K 3/28 |
| | | | 310/184 |
| 2009/0140596 A1 | 6/2009 | Kaiser et al. | |
| 2009/0146523 A1 | 6/2009 | Kouda et al. | |
| 2013/0113330 A1 | 5/2013 | Saito et al. | |
| 2014/0319953 A1 | 10/2014 | Rahman et al. | |
| 2015/0061450 A1 | 3/2015 | Nakagawa | |
| 2016/0056679 A1 | 2/2016 | Sakaue et al. | |

FOREIGN PATENT DOCUMENTS

| | | |
|---|---|---|
| WO | 2013/145459 A1 | 10/2013 |
| WO | 2014/162626 A1 | 10/2014 |

\* cited by examiner

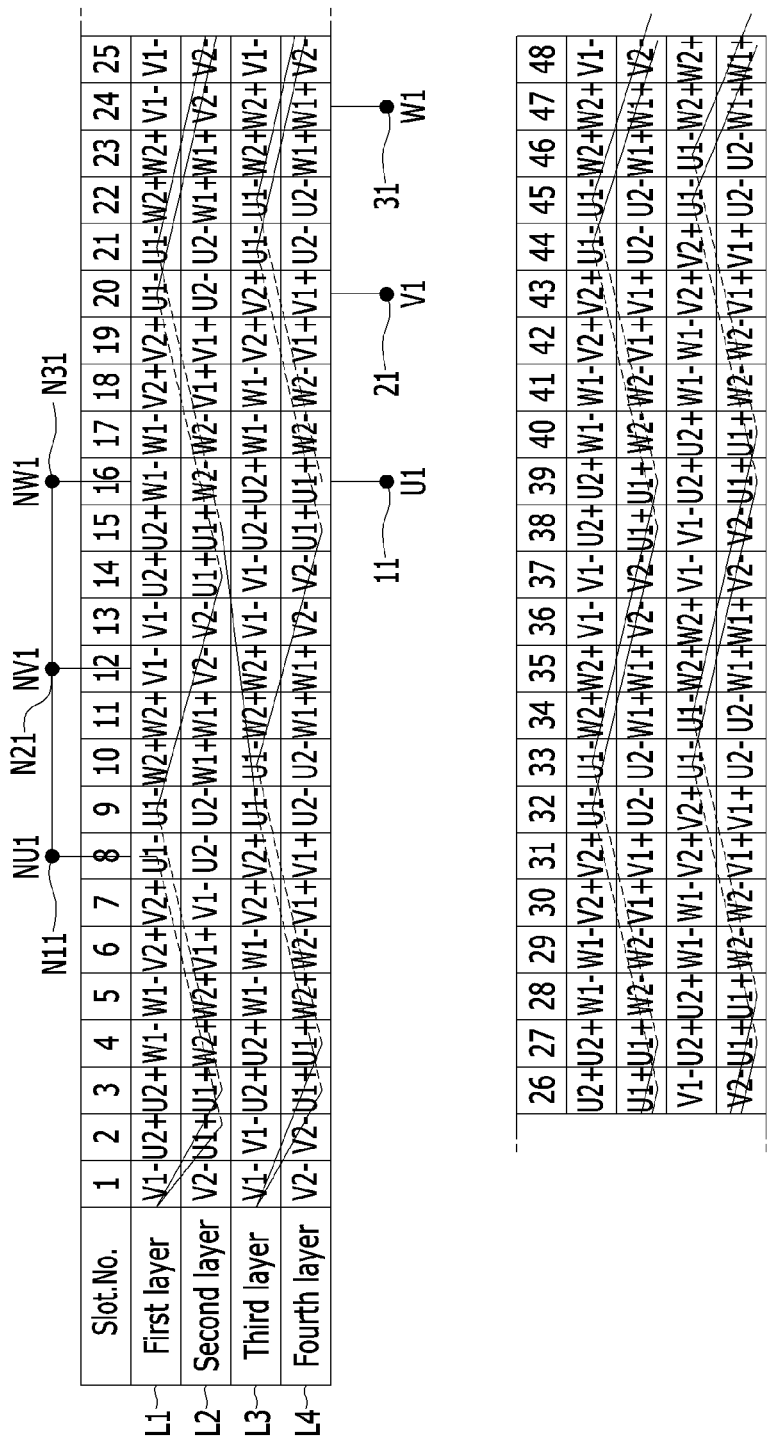

STATOR WINDING PATTERN FOR HAIRPIN DRIVE MOTOR

CROSS-REFERENCE TO RELATED APPLICATION

This application claims priority to and the benefit of Korean Patent Application No. 10-2014-0172123 filed in the Korean Intellectual Property Office on Dec. 3, 2014, the entire contents of which are incorporated herein by reference.

BACKGROUND OF THE DISCLOSURE (a) Technical Field

Embodiments of the present disclosure relate generally to a drive motor for an environmentally friendly vehicle, and more particularly, to a stator winding pattern of a hairpin drive motor capable of minimizing a maximum potential difference at an adjacent section between phases in a hairpin drive motor.

(b) Description of the Related Art

In general, environmentally friendly vehicles, such as a hybrid vehicle or an electric vehicle, may generate a driving torque by an electric motor (hereinafter referred to as "drive motor") for obtaining a rotating force based on electrical energy. A hybrid vehicle can run in an electric vehicle (EV) mode (i.e., a pure electric mode) using only power of a drive motor or a hybrid electric vehicle (HEV) mode using driving torques of both an engine and a drive motor for power. Meanwhile, an electric vehicle runs using solely the torque of the drive motor for power.

For example, a drive motor used as a power source for an environmentally friendly vehicle is generally a permanent magnet synchronous motor (PMSM). The drive motor as a PMSM typically includes a stator to generate a magnetic flux, a rotor spaced apart from the stator by a predetermined gap, and a permanent magnet installed at the rotor. The stator includes a plurality of slots which are formed at an inner peripheral portion of a stator core, and a stator coil is wound in the slots. Accordingly, if an AC current is applied to a stator coil, the stator generates a rotation magnetic field so that a rotation torque may be generated in the stator due to the rotation magnetic field.

Meanwhile, the drive motor is classified into a distribution winding drive motor and a concentrated winding drive motor depending on a winding scheme of the stator coil. A stator of the distribution winding drive motor is divided into a segment coil stator and a distribution winding coil stator according to a winding scheme of the coil. The segment coil stator is a stator for inserting a coil in a slot of a stator core after primarily molding the coil to have a predetermined shape in advance. The distribution winding coil stator inserts a coil assembly in a slot of the stator core.

Output of the drive motor is proportional to the number of turns of a coil wound in the stator core. However, if the number of turns of the coil is increased, the size of the stator core or the motor is inevitably increased which results in reduction in miniaturization. Accordingly, in order to improve the output of the motor without increasing the size of the motor, a method of increasing a space factor of a coil wound around the stator core (e.g., by minimizing a dead space between the stator core and a winding coil) may be considered.

In this regard, in place of using a ring-shaped coil (i.e., a "ring-shaped wire") having a circular section as a coil winding, a method of using a flat coil (i.e., a "flat wire") having a square section has been actively studied. The flat coil may reduce the dead space and improve the space factor due to a shape of a section as compared with the ring-shaped coil. However, the flat coil has a difficulty in coil winding work as compared to the ring-shaped coil. This is because the flat coil is manufactured to have a wide cross-section as compared with the ring shaped coil in order to maximize the space factor so it is difficult to use a winding machine.

Accordingly, methods have been proposed for easily performing coil winding work of the flat coil in a segment stator of the distribution winding drive motor, in which a plurality of separated hairpins (i.e., substantially U-shape or V-shape) are inserted and engaged into each slot of the stator core, and in which sequentially welds between hairpins disposed in the slot are formed to continuously form a coil winding of the stator core. A motor including a coil winding formed in this way is conventionally referred to as a "hairpin drive motor." The coil winding structure of the hairpin drive motor overcomes a device limit due to a winding machine and coil winding work is easily possible in a case of the flat coil and may implement a miniaturized motor with high power by increasing the space factor of the coil.

Since the hairpin drive motor described above is configured with a continuous winding by inserting a leg of the hairpin in a slot of the stator core and welding an adjacent leg in a radial direction in the slot, a section adjacent to a hairpin on a different phase is generated. Insulation is weak in the above section so that there is a need for a separate insulation structure. Meanwhile, in a conventional stator winding structure of a hairpin drive motor, if a rotating direction of the motor and a draw out position of one phase (e.g., a U-phase) are determined, a position of a different phase (e.g., V-phase or W-phase) may be determined in each slot with a predetermined pattern. In this case, a 3-phase draw out part and a neutral point draw out part may be formed as a pattern of a rule minimizing a pitch between phases in order to simplify a winding structure of a hairpin by reducing a draw out length of the winding coil.

However, since a conventional 3-phase draw output part has a coil winding structure minimizing a patch between phases, a section adjacent to a hairpin of different phases is generated in an insertion direction of the hairpin inserted into a slot of the stator. Therefore, a section having a maximum potential difference is located in the adjacent section between phases, thereby causing an insulation problem of the motor.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide a stator winding pattern of a hairpin driver motor having advantages of minimizing increase in draw out lengths of a phase draw out part and a neutral draw out part of one shape while reducing a potential difference of an adjacent section between phases by limiting a winding position of draw out parts having different phases based on a draw out part of one phase.

Embodiments of the present disclosure provide: a stator winding pattern of a hairpin drive motor including a stator with 8 poles and 48 slots of a distribution winding where a hairpin-type of flat coil is inserted into a slot of a stator core and configured by a full pitch winding implementing 6 pitches of 3 phases and 2 in parallel, the pitch being a distance between adjacent slots, characterized in that: first to fourth layers are formed in the slot of the stator core in a radial direction of the stator core; and when a first layer or a fourth layer is set as a draw out part of one phase in an optional reference slot, a first draw out of a different phase is formed in a draw out slot having 16 pitches in a slot forward direction in a same layer based on the reference slot, and a second draw out of the different phase is formed in a draw out slot having 32 pitches in the slot forward direction in the same layer based on the reference slot.

In the stator winding pattern, neutral draw out parts of three phases may be formed in the first layer by the draw out part of the one phase, a first neutral point draw out part of the different phase may be formed in the draw out slot having 16 pitches in the slot forward direction based on a neutral point draw out part of the one phase, and a second neutral point draw out part of the different phase may be formed in the draw out slot having 32 pitches in the slot forward direction.

In the stator winding pattern, the neutral point draw out parts of the three phases may be formed in the fourth layer by the draw out part of the one phase, the first neutral point draw out part of the different phase may be formed in the draw out slot having 16 pitches in the slot forward direction, and the second neutral point draw out part of the different phase may be formed in the draw out slot having 16 pitches in a slot reverse direction.

Furthermore, according to embodiments of the present disclosure, a stator winding pattern of a hairpin drive motor includes a stator with 8 poles and 48 slots of a distribution winding where a hairpin-type flat coil is inserted into a slot of a stator core and configured by a full pitch winding implementing 6 pitches of 3 phases and 2 in parallel (U1, U2/V1, V2/W1, and W2), the 48 slots being referred to as first to 48th slot in a forward direction, characterized in that: first to fourth layers are formed in the slot of the stator core in a radial direction of the stator core; and when a fourth layer of a 16th slot is set as a U1 draw out part, a V1 draw out part is formed in a fourth layer of a 32nd slot, a W1 draw out part is formed in a fourth layer of a 48th slot, a U2 draw out part is formed in a first layer of a 14th slot, a V2 draw out part is formed in a first layer of a 30th slot, and a W2 draw out part is formed in a first layer of a 46th slot.

In the stator winding pattern, neutral point draw out parts of three phases U1, V1, and W1 may be formed in the first layer by the U1 draw out part, and the U1 neutral point draw out part may be formed in a first layer of an 8th slot, the V1 neutral point draw out part may be formed in a first layer of a 24th slot, and the W1 neutral point draw out part may be formed in a first layer of a 40th slot.

In the stator winding pattern, neutral point draw out parts of the three phases U2, V2, and W2 may be formed in the fourth layer by the U1 draw out part, and the U2 neutral point draw out part may be formed in a fourth layer of a 22nd slot, the V2 neutral point draw out part may be formed in a fourth layer of a 38th lot, and the W2 neutral point draw out part may be formed in a fourth layer of a 6th slot.

In view of the above, embodiments of the present disclosure may minimize increase in draw out lengths of a draw out part and a neutral draw out part of one shape while reducing a potential difference of an adjacent section between phases by limiting a winding position of draw out parts having different phases based on a draw out part of one phase. Since a maximum potential difference at an adjacent section between phases may be reduced, insulation performance of a drive motor may be ensured without using a separate insulation component between stator coils having different phases. Further, since a coating thickness of a stator coil based on the same capacity of the motor may be reduced, a copper use amount of the stator coil can be reduced, a cost can be reduced, and motor efficiency can be increased.

BRIEF DESCRIPTION OF THE DRAWINGS

In the following detailed description, only certain embodiments of the present disclosure have been shown and described, simply by way of illustration.

FIG. 4 is a diagram illustrating a potential difference between phases of a stator winding pattern of a hairpin drive motor in accordance with a comparative example shown in FIG. 3.

DETAILED DESCRIPTION OF THE EMBODIMENTS

Figure 1:
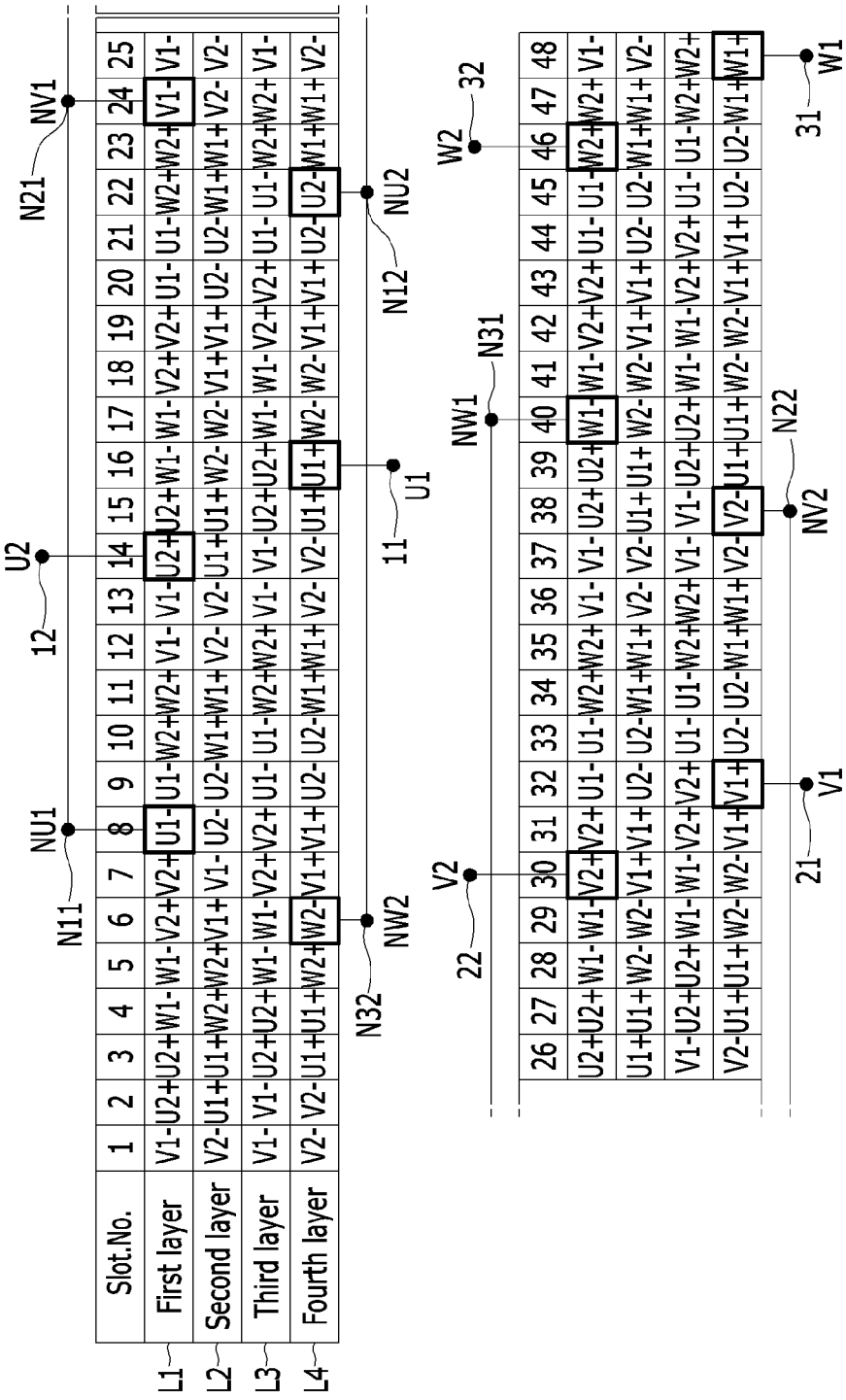
FIG. 1 is a diagram illustrating a stator winding pattern of a hairpin drive motor in accordance with embodiments of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure. Parts that are irrelevant to the description are omitted to clearly illustrate the present disclosure, and like reference numbers designate like constituent elements through the specification. Further, the size and thickness of each configuration shown in the drawings are optionally illustrated for better understanding and ease of description, the present disclosure is not limited to shown drawings, and the thickness is exaggerated for clarity of a plurality of parts and regions.

In the following detailed description, the terms "first" and "second" will be used to discriminate one component from the other component, but the components may not be limited to the above terms. In addition, in the following specification, unless explicitly described to the contrary, the word "comprise" and variations such as "comprises" or "comprising" will be understood to imply the inclusion of stated elements but not the exclusion of any other elements. In the following description, the suffixes "~ unit", "~ means", "~ part", and "~ member" mean units of a general configuration that perform at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Referring now to the disclosed embodiments, FIG. 1 is a diagram illustrating a stator winding pattern of a hairpin drive motor in accordance with embodiments of the present disclosure.

As shown in FIG. 1, a stator winding pattern of a hairpin drive motor of the present disclosure is applicable to a drive motor for a hybrid vehicle and/or electric vehicle to obtain a driving torque from electrical energy by an environmentally friendly vehicle (e.g., an electric or hybrid vehicle). For example, the stator winding pattern of the hairpin drive motor in accordance with the present disclosure is applicable to a permanent magnet synchronous motor (PMSM) as the above drive motor.

The PMSM includes a stator to generate a magnetic flux, a rotor spaced apart from the stator by a predetermined gap, and a permanent magnet installed at the rotor. The stator includes a stator core in which a plurality of steel plates are laminated. A plurality of slots are formed toward a center shaft in the stator core in a radial direction. A stator coil is wound around the slots. The stator coil is a hairpin-type of flat coil. For example, the stator coil has a pair of legs and has a U-shape or a V-shape. The stator coil may include a flat coil having a square section.

The hairpin type of stator coil is inserted into slots of a stator core, and end portions of a pair of legs protrude outside of the slot. The protruded portions of the legs are bent, welded, and electrically connected to each other. That is, a plurality of separated stator coils are inserted and engaged in the slots of the stator core and the stator coils are sequentially welded, and the embodiment is applicable to a hairpin drive motor formed therein with a coil winding of the stator.

Although the hairpin drive motor can be applied to a permanent magnet-type of hairpin drive motor as a drive motor used in the environmentally friendly vehicle, the scope of the present disclosure is not limited thereto. A technical scope of the present disclosure is applicable to various types and purposes of a hairpin drive motor.

Before describing the stator winding pattern of a hairpin drive motor in accordance with an exemplary embodiment of the present disclosure, the stator core includes a number of slots being a multiple of the number of poles×the number of phases. For example, embodiments of the present disclosure is applicable to a full pitch winding stator winding structure including a stator with 8 poles and 48 slots of a distribution winding where a hairpin type of flat coil is wound around slots of the stator core, and implementing 3 phases with 2 in parallel (U1, U2/V1, V2/W1, W2).

The 48 slots (i.e., slot numbers 1 to 48) are radially formed from a hollow portion of the stator. The 48 slots 1 to 48 may have the same shape. Further, the 48 slots 1 to 48 may have a multi-layered structure. Each slot may include four layers of first to fourth layers in the order from an outer peripheral side to an inner peripheral side of the stator core in a radial direction of the stator core. Further, the 3 phases with 2 in parallel (U1, U2/V1, V2/W1, W2) means phases having different positions of an N-pole and an S-pole of an electro-magnetized stator core by allowing a current to flow through different paths in the stator coil.

Hereinafter, a progress direction from a first slot to a 48th slot in the stator core refers to a slot forward direction (i.e., motor rotation direction), and a progress direction from a 48th slot to a first slot in the stator core refers to a slot reverse direction (i.e., motor rotation opposite direction).

Further, (+) and (−) in the 3 phases with 2 in parallel (U1, U2/V1, V2/W1, W2) means a flowing direction of the current in each phase.

Moreover, embodiments of the present disclosure include a stator with 8 poles and 48 slots. When one row between adjacent slots is determined as 1 pitch, the present disclosure is applicable to a stator winding structure of a full pitch winding 6 pitches implementing the 3 phases with 2 in parallel (U1, U2/V1, V2/W1, W2). For example, in a stator winding structure of a full pitch winding 6 pitches implementing the 3 phases with 2 in parallel, if a U1+ phase is set to two optional adjacent slots (fourth layer of 15th and 16th slots in the drawing), a U1+ phase is disposed in 27th and 28th slots which are slots of 12 pitches in the same layer. When a condition of a full pitch winding 6 pitches is considered based on the 15th and 16th slots, a U2− phase may be disposed in a fourth layer of 21st and 22nd slots corresponding to a slot of 6 pitches. In addition, U1− phases may be disposed in a third layer of the slots based on 21st and 22nd slots, respectively.

Further, U2+ phases are disposed in a third layer of the slots based on the 15th and 16th slots, respectively. U1+ phases are disposed in the second layer of 14th and 15th slots corresponding to the 15th and 16th slots, respectively, while U2+ phases are disposed in the first layer of the 14th and 15th slots, respectively. Moreover, U2− phases are disposed in the second layer of the 20th and 21st slots corresponding to the 21st and 22nd slots, respectively, while U1− phases are disposed in the first layer of the 20th and 21st slots, respectively. Different phases are moved in one direction (slot forward direction or slot reverse direction) by a 1 pitch slot by disposing the different phases in the first and second layers of 14th and 15th, and 20th and 21st slots based on the third and fourth layers of 15th and 16th, and 21st and 22nd slots for the purpose of improving NVH performance of the motor by applying a skew to a stator coil.

Furthermore, in an example as described above, W1 and W2 phases and V1 and V2 phases are sequentially disposed in a slot forward direction based on U1 and U2 phases and are disposed in the same manner as in U1 and U2 phases, each phase of 3 phases with 2 in parallel (U1, U2/V1, V2/W1, W2) as shown may be regularly disposed in a full layer of 48 slots as the full pitch winding 6 pitches. Since a method of forming a winding pattern as described above in the stator winding structure of the full pitch winding 6 pitches implementing 3 phases with 2 in parallel is well known in the art, a detailed description thereof is omitted from the specification.

The embodiments of the present disclosure as described above feature a structure capable of minimizing an increase in draw out lengths of a draw out part and a neutral draw out part of one shape while reducing a maximum potential difference at an adjacent section between phases by limiting a winding structure of draw out parts having different shapes based on a draw out part of one phase based on a stator winding pattern for a hairpin drive motor. Accordingly, in the stator pattern of a hairpin drive motor in accordance with the present disclosure, if an optional reference slot is set to a draw out part U1 or U2, a draw out part of a different shape V1 or V2 based on the reference slot may be formed in a draw out slot having 16 pitches in a slot forward direction in the same layer (first layer or fourth layer).

Further, in the stator pattern of a hairpin drive motor in accordance with the present disclosure, a draw out part having a different shape W1 or W2 based on the reference slot may be formed in a draw out slot having 32 pitches in a slot forward direction in the same layer (first layer or fourth layer). That is, a draw out part of the different phase W1 or W2 may be formed in a draw out slot having 16 pitches in a slot forward direction based on a draw out part having a different phase V1 or V2 in the same layer (first layer or fourth layer).

In addition, draw out parts of 3 phases may be formed in the same layer (first layer or fourth layer) of the draw out part by a preset draw out part U1 or U2 of one shape. In this case, based on a neutral point draw out part NU1 of one phase, a neutral point draw out part of a different shape NV1 may be formed in a draw out slot having 28 pitches in a slot forward direction in the first layer and a draw out part of a different phase NW1 may be formed in a draw out slot having 32 pitches in a slot forward direction. That is, the neutral point draw out of a different shape NV1 may be formed in a draw out slot having 16 pitches in a slot forward direction based on a neutral point draw out part of a different shape NU1 in the first layer.

Moreover, based on the neutral point draw out part NU2 of one phase, a neutral point draw out of a different shape NV2 may be formed in a draw out slot having 16 pitches in a slot forward direction in the fourth layer, and a neutral point draw out part of a different shape NW2 may be formed in a draw out slot having 16 pitches in a slot reverse direction.

Hereinafter, the stator winding pattern of the hairpin drive motor in accordance with embodiments of the present disclosure will be described in detail with reference to FIG. 1.

First to fourth layers L1, L2, L3, and L4 may be formed in 48 slots 1 to 48 in a radial direction of a stator core based on when respective slots 1 to 48 are disposed in the order from a first slot to a 48th slot in the forward direction.

First, for example, if a fourth layer L4 of a 16th slot is set to a U1 draw out part 11 as a preset reference slot, a V1 draw out part 21 may be formed in a fourth layer L4 of a 32nd slot distant from a 16th slot of the U1 draw out part 11 in a slot forward direction by 16 pitches. In addition, a W1 draw out part 31 may be formed in a fourth layer L4 of a 48th slot distant from a 16th slot of the U1 draw out part 11 in a slot forward direction by 32 pitches based on a 16th slot of the U1 draw out part 11. That is, a W1 draw out part 31 may be formed in a fourth layer L4 of a 48th slot distant from a 32nd slot of the V1 draw out part 21 in a slot forward direction by 16 pitches based on a 16th slot of the U1 draw out part 11. In other words, a W1 draw out part 31 may be formed in a fourth layer L4 of a 48th slot distant from a 16th slot of the U1 draw out part 11 in a reverse direction by 16 pitches based on a 16th slot of the U1 draw out part 11.

Further, a V1 draw out part 21 may be formed in a fourth layer L4 of a 32nd slot distant from a 48th slot of the W1 draw out part 31 in a reverse direction by 16 pitches based on a 48th slot of the W1 draw out part 31. The V1 draw out part 21 may be formed in a fourth layer L4 of a 32nd slot distant from a 16th slot of the U1 draw out part 11 in a reverse direction by 32 pitches based on a 16th slot of the U1 draw out part 11.

Meanwhile, based on a fourth layer L4 of a 16th slot of the U1 draw out part 11, a U2 draw out part 12 is formed in a first layer L1 of a 14th slot. Based on the 14th slot of the U2 draw out part 12, a V2 draw out part 22 may be formed in the first layer L1 of a 30th slot distant from the 14th slot of the U2 draw out part 12 by 16 pitches.

Further, a W1 draw out part 32 may be formed in a first layer L1 of a 46th slot distant from a 14th slot of the V1 draw out part 12 in a slot forward direction by 32 pitches based on a 14th slot of the U2 draw out part 12. That is, the W2 draw out part 32 may be formed in the first layer L1 of a 46th slot distant from the 33rd slot of the V2 draw out part 22 by 16 pitches in the slot forward direction. In other words, a W1 draw out part 32 may be formed in a first layer L1 of a 46th slot distant from a 14th slot of the U2 draw out part 12 in a slot reverse direction by 16 pitches based on a 14th slot of the U2 draw out part 12.

Further, the V2 draw out part 22 may be formed in the first layer L1 of the 30th slot distant from a 46th slot of the W2 draw out part 32 by 16 pitches in the slot reverse direction based on a 46th slot of the W2 draw out part 32. Based on the 14th slot of the U2 draw out part 12, the V2 draw out part 22 may be formed in the first layer L1 of the 30th slot distant from the 14th slot of the U2 draw out part 12 by 32 pitches in the slot reverse direction.

In addition, neutral point draw out parts N11, N21, and N31 of 3 phases U1, V1, and W1 may be formed in a first layer L1 of slots by a U1 draw out part 11 of the 16th slot set as an optional reference point. The U1 neutral point draw out part N11 is formed in a first layer L1 of an eighth slot based on a fourth layer L4 of a 16th slot of the U1 draw out part 11. The V1 neutral point draw out part N21 may be formed in a first layer L1 of a 36th slot distant from an 8th slot of the U1 neutral draw out part N11 in a slot forward direction by 16 pitches based on the 8th slot of the U1 neutral draw out part N11.

Further, the W1 neutral point draw out part N31 may be formed in a first layer L1 of a 16th slot distant from an 8th slot of the U1 neutral draw out part N11 in a slot forward direction by 32 pitches based on the 8th slot of the U1 neutral draw out part N11. That is, the W1 neutral point draw out part N31 may be formed in a first layer L1 of a 40th slot distant from a 24th slot of the V1 neutral draw out part N21 in a slot forward direction by 16 pitches. In other words, the W1 neutral point draw out part N31 may be formed in a first layer L1 of a 40th slot distant from an 8th slot of the U1 neutral draw out part N11 in a slot reverse direction by 16 pitches based on the 8th slot of the U1 neutral draw out part N11.

Moreover, the V1 neutral point draw out part N21 may be formed in a first layer L1 of a 24th slot distant from a 40th slot of the W1 neutral draw out part N31 in a slot reverse direction by 16 pitches based on the 40th slot of the W1 neutral draw out part N31. Based on the 8th slot of the U1 neutral draw out part N11, the V1 neutral point draw out part N21 may be formed in a first layer L1 of a 24th slot distant from an 8th slot of the U1 neutral draw out part N11 in a slot reverse direction by 32 pitches.

Meanwhile, neutral point draw out parts N12, N22, and N32 of 3 phases U2, V2, and W2 may be formed in a first layer L1 of slots by a U1 draw out part 11 of the 16th slot set as an optional reference point. The U2 neutral point draw out part N12 is formed in a fourth layer L4 of a 22nd slot based on a fourth layer L4 of a 16th slot of the U1 draw out part 11. The V2 neutral point draw out part N22 may be formed in a fourth layer L4 of a 38th slot distant from a 22nd slot of the U2 neutral draw out part N12 in a slot forward direction by 16 pitches based on the 22nd slot of the U2 neutral draw out part N12.

Further, the W2 neutral point draw out part N32 may be formed in a fourth layer L4 of a 6th slot distant from a 22nd slot of the U2 neutral draw out part N12 in a slot reverse direction by 16 pitches based on the 8th slot of the U2 neutral draw out part N12. In other words, the W2 neutral point draw out part N32 may be formed in a fourth layer L4 of a 6th slot distant from a 22nd slot of the U2 neutral draw out part N12 in a slot forward direction by 32 pitches based on the 22nd slot of the U2 neutral draw out part N12. That is, the W2 neutral point draw out part N32 may be formed in a fourth layer L4 of a 6th slot distant from a 38th slot of the V2 neutral draw out part N22 in a slot forward direction by 16 pitches. Therefore, according to the stator winding pattern of a hairpin drive motor in accordance with embodiments of the present disclosure, the draw out part V1 or V2 of a different phase and the draw out part W1 or W2 of a different phase may be configured in a draw out slot distant from the draw out part U1 or U2 of one phase which is optionally set in a slot forward direction by 16 pitches.

Figure 2:
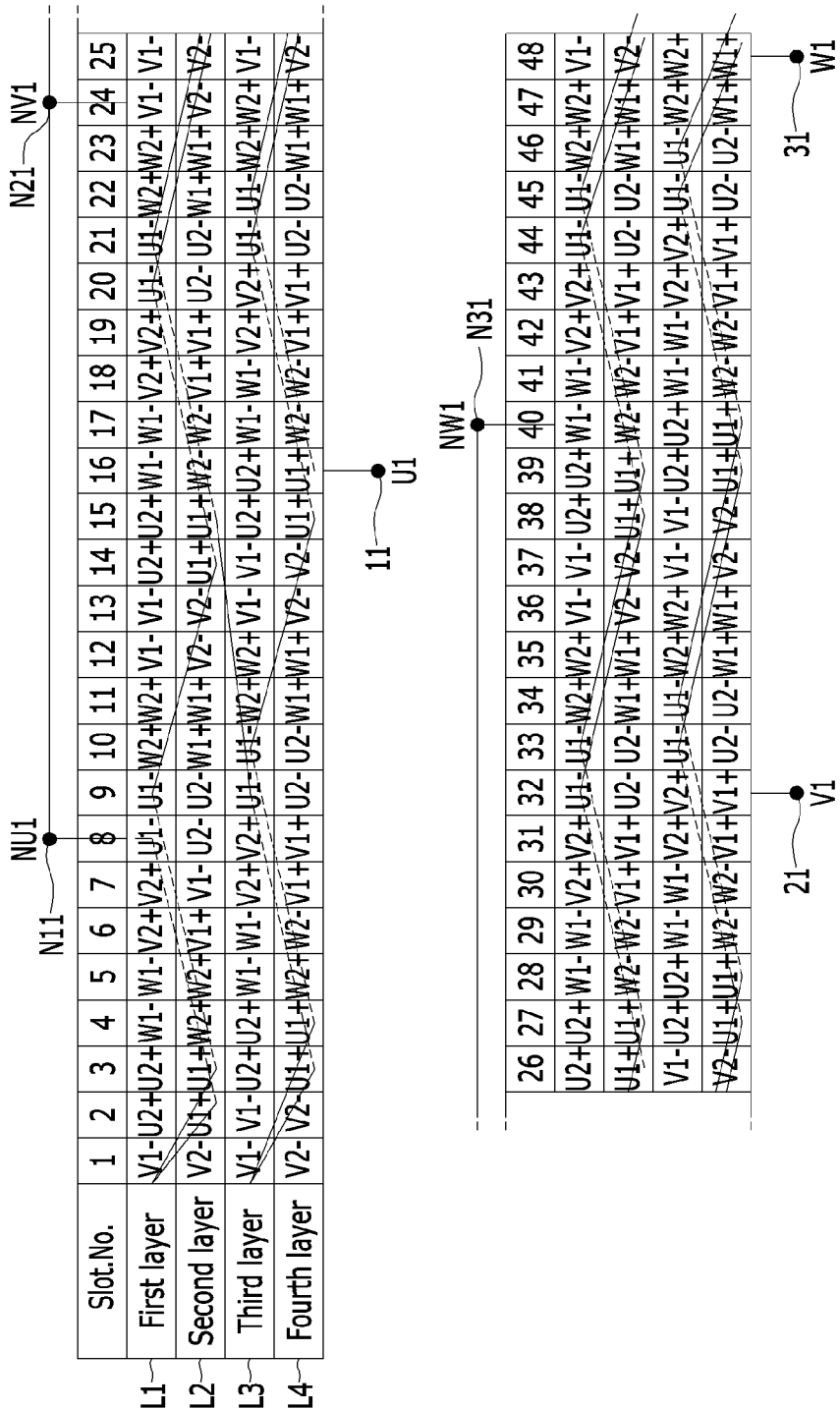
FIG. 2 is a diagram illustrating a potential difference between phases of a stator winding pattern of a hairpin drive motor in accordance with embodiments of the present disclosure shown in FIG. 1.

Meanwhile, as shown in FIG. 2, for example, when a current flows to a path of a U1 phase, since a stator coil of 16 turns (i.e., 16 hairpin stator coil) having a pair of legs is configured, a reference voltage of 32 V becomes gradually reduced proportional to a predetermined multiple in the direction of the U1 neutral point draw out part N11 from the U1 draw out part 11. For example, when a voltage at the U1 draw out part 11 is 32 V, a voltage at the U1 neutral point draw out N11 becomes 0 V. That is, a reverse breakdown voltage is generated per leg of a stator coil of 16 turns in the direction of the U1 draw out part 11 from the U1 neutral point draw out part N11 so that a voltage is increased to the range of 0 V to 32 V.

Accordingly, the V1 draw out part 21 being a draw out part of a different phase is formed in a draw out slot distant from the U1 draw out part 11 by 16 pitches in the slot forward direction, and is configured in a draw out slot distant from the V1 draw out part 21 by 16 pitches in the slot forward direction. Furthermore, since a voltage is reduced proportional to a predetermined multiple in the direction of the draw out parts N11, N21, and N31 of respective phases U1, V1, and W1 from the draw out parts 11, 21, and 31 of the respective phases U1, V1, and W1 by shifting the draw out parts 21 and 31 of different phases V1 and W1 based on the U1 draw out part 11 by predetermined sections (i.e., 16 pitches), a maximum potential difference at an adjacent section between phases may be minimized. That is, since the draw out parts 21 and 31 of different phases V1 and W1 are configured in a position between the U1 draw out part 11 and the U1 neutral point draw out part N11 where a voltage is reduced by a predetermined section (having 16 pitches), the maximum potential difference at an adjacent section between phases may be significantly reduced.

Hereinafter, an operational effect of the stator winding pattern of the hairpin drive motor according to embodiments of the present disclosure as described above is described by comparing with comparative examples of FIG. 3 and FIG. 4.

Figure 3:
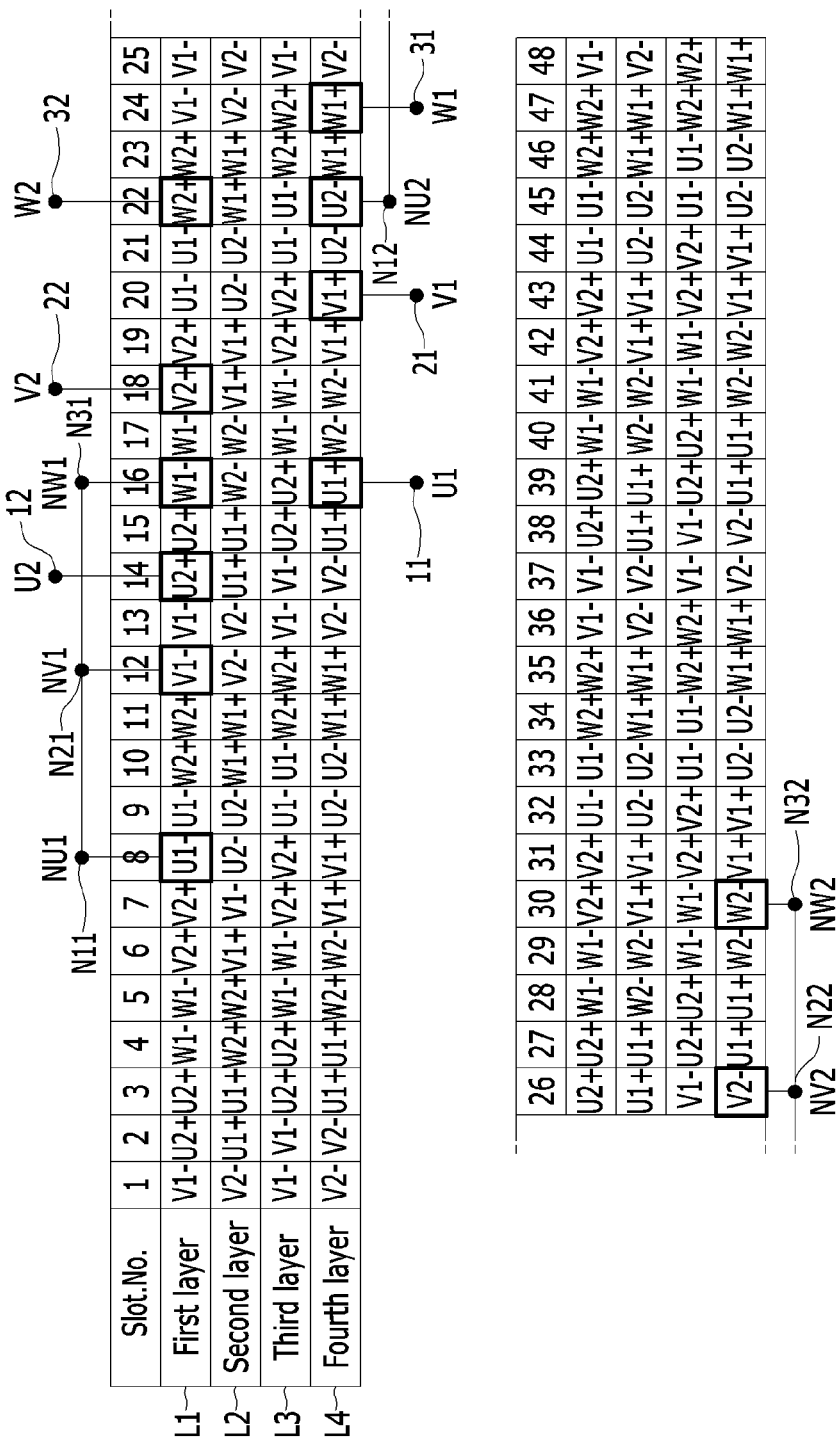
FIG. 3 is a diagram illustrating a stator winding pattern of a hairpin drive motor according to a comparative example for describing an operational effect of a stator winding pattern of a hairpin drive motor in accordance with embodiments of the present disclosure.

As shown in FIG. 3, if an optional reference slot is set to a draw out part U1 or U2 of one phase in the comparative example corresponding to embodiments of the present disclosure, a draw out part of a different phase V1 or V2 and a draw out part of a different phase W1 or W2 are configured in a draw out slot distant from the reference slot in the slot forward direction by 4 pitches, respectively.

In detail, for example, if a fourth layer L4 of a 16th slot is set to the U1 draw out part 11, the V1 draw out part 21 may be formed in a fourth layer L4 of a 20th slot distant from the 16th slot of the U1 draw out part 11 in the slot forward direction. Further, the W1 draw out part 31 may be formed in the fourth layer L4 of the 24th slot distant from the 16th slot of the U1 draw out part 11 in the slot forward direction by 8 pitches based on the 16th slot of the U1 draw out part 11. That is, the W1 draw out part 31 may be formed in the fourth layer L4 of the 24th slot distant from the 20th slot of the V1 draw out part 21 in the slot forward direction by 4 pitches.

Meanwhile, in the comparative example, the U2 draw out part 12 is formed in a first layer L1 of the 14th slot based on a fourth layer L4 of the 16th slot of the U1 draw out part 11. The V2 draw out part 22 may be formed in the first layer of the 18th slot distant from the 14th slot of the U2 draw out part 12 in the slot forward direction by 4 pitches based on the 14th slot of the U2 draw out part 12. Based on the 14th slot of the U2 draw out part 12, the W2 draw out part 32 may be formed in the first layer L1 of the 22nd slot distant from the 14th slot of the U2 draw out part 12 in the slot forward direction by 8 pitches. That is, the W2 draw out part 32 may be formed in a first layer L1 of the 22nd slot distant from the 18th slot of the V2 draw out part 22 in the slot forward direction by 4 pitches.

Further, in the comparative example, a U1 neutral point draw out part N11 is formed in the first layer L1 of the 8th slot based on a fourth layer L4 of a 16th slot of the U1 draw out part 11. A V1 neutral point draw out part N21 may be formed in the first layer L1 of the 12th slot distant from the 8th slot of the U1 neutral point draw out part N11 in the slot forward direction by 4 pitches. In addition, the W1 neutral point draw out part N31 may be formed in the first layer L1 of the 16th slot distant from the 8th slot of the U1 neutral point draw out part N11 in the slot forward direction by 8 pitches. That is, the W1 neutral point draw out part N31 may be formed in the first layer L1 of the 16th slot distant from a 12th slot of the V1 neutral point draw out part N21 in the slot forward direction by 4 pitches. In the same manner, a U2 neutral point draw out part N12 is formed in a fourth layer L4 of the 22nd slot based on the fourth layer L4 of a 16th slot of the U1 draw out part 11 in the comparative example.

In addition, a V2 neutral point draw out part N22 may be formed in the fourth layer L4 of the 26th slot distant from the 22nd slot of the U2 neutral point draw out part N12 in the slot forward direction by 4 pitches. Moreover, a W2 neutral point draw out part N32 may be formed in the fourth layer L4 of the 30th slot distant from the 22nd slot of the U2 neutral point draw out part N12 in the slot forward direction by 8 pitches. That is, the W2 neutral point draw out part N32 may be formed in the fourth layer L4 of the 30th slot distant from the 26th slot of the V2 neutral point draw out part N22 in the slot forward direction by 4 pitches. Therefore, the draw out part V1 or V2 of a different phase and the draw out part W1 or W2 of a different phase may be configured in a draw out slot distant from the preset draw out part U1 or U2 of one phase in a slot forward direction by four pitches, respectively.

In the meantime, in the comparative example, as shown in FIG. 4, when a current flows to a path of a U1 phase, a V1 draw out part 21 is configured in the draw out slot distant from the U1 draw out part 11 in the slot forward direction by four pitches, and a W1 draw out part 31 is configured in the draw out slot distant from the V1 draw out part 21 in the slot forward direction by four pitches. Accordingly, since draw out parts 21 and 31 of different phases V1 and W1 are configured closest to the U1 draw out part 11 based on the U1 draw out part 11, a voltage becomes reduced proportional to a predetermined multiple in the direction of neutral point draw out parts N11, N21, and N31 of each phase from draw out parts 11, 21, and 31 of each phase. When taking into consideration the above characteristic, a maximum potential difference occurs at an adjacent section of draw out parts 11, 21, and 31 of each phase having a relatively high voltage due to reduction of the pitch between the draw out parts 11, 21, and 31 of each phase.

For example, a maximum potential difference between a U1 phase and a V1 phase in the comparative example is described. Under the condition of reducing a reference voltage of 32 V in the direction of the U1 neutral point draw out part N11 from the U1 draw out part 11 proportional to a predetermined multiple, since E U1=31 sin θ and E V1=32 sin(θ−120°), the maximum potential difference between a U1 phase and a V1 phase represents 54.56 V. In this way, a section having the maximum potential difference is included in an adjacent section of the drawing out parts 11, 21, and 31 having a relatively high voltage due to reduction of the pitch between draw out parts 11, 21, and 31 of each phase in the comparative example so that an insulation problem of the motor may be caused.

As in the comparative example, the pitch between draw out parts 11, 21, and 31 and neutral point draw out parts N11, N21, and N31 of 3 phases is minimized for the purpose of collecting the draw out parts 11, 21, and 31 and the neutral point draw out parts N11, N21, and N31 of 3 phases close to each other and of reducing draw out lengths of the draw out parts 11, 21, and 31 and the neutral point draw out parts N11, N21, and N31 of 3 phases. However, in the stator winding pattern of a hairpin drive motor in accordance with embodiments of the present disclosure, as described above with reference to FIG. 1 and FIG. 2, since draw out parts 21 and 31 of different phases V1 and W1 are configured at a position where a voltage is reduced from the U1 draw out part 11 to the U1 neutral point draw out part N11 by a predetermined section (having 16 pitches), the potential difference of the adjacent section between phases may be minimized. For example, a maximum potential difference between a U1 phase and a V1 phase in accordance with embodiments of the present disclosure is described. Under the condition of reducing a reference voltage of 32 V in the direction of the U1 neutral point draw out part N11 from the U1 draw out part 11 proportional to a predetermined multiple, since E U1=31 sin θ and E V1=32 sin(θ−120°), the maximum potential difference between a U1 phase and a V1 phase represents 51.97 V.

According to the stator winding pattern of the hairpin drive motor in accordance with the present disclosure as described above, the maximum potential difference at an adjacent section between phases may be minimized by shifting draw out parts of different phases by a predetermined section (having 16 pitches) from the draw out part of one phase. That is, in accordance with an exemplary embodiment of the present disclosure, the maximum potential difference at an adjacent section between phases may be reduced by about 4.75% as compared with the above comparative example. Accordingly, a maximum potential difference at an adjacent section between phases may be minimized while minimizing an increase in a draw out length of a phase draw out part and a neutral draw out part of one shape by limiting a winding position of a draw out part having different phases based on a draw out part of one phase.

Therefore, since embodiments of the present disclosure may reduce the maximum potential difference at an adjacent section between phases, insulation performance of the drive motor may be ensured without using a separate insulation component between stator coils of different phases. Further, since a coating thickness of a stator coil may be reduced based on the same capacity of the motor, a copper use amount of the stator coil can be reduced, a cost can be reduced, and motor efficiency can be increased.

Embodiments of the present disclosure are disclosed herein, but the present disclosure is not limited to the disclosed embodiments. On the contrary, the present disclosure is intended to cover various modifications and equivalent arrangements included within the appended claims and the detailed description and the accompanying drawings of the present disclosure.

DESCRIPTION OF SYMBOLS

11 . . . U1 draw out part 12 . . . U2 draw out part
21 . . . V1 draw out part 22 . . . V2 draw out part
31 . . . W1 draw out part 32 . . . W2 draw out part
L1-L4 . . . first to fourth layers N11 . . . U1 neutral point draw out part
N12 . . . U2 neutral point draw out part N21 . . . V1 neutral point draw out part
N22 . . . V2 neutral point draw out part N31 . . . W1 neutral point draw out part
N32 . . . W2 neutral point draw out part

What is claimed is:

1. A stator winding pattern of a hairpin drive motor including a stator with 8 poles and 48 slots of a distribution winding where a hairpin-type of flat coil is inserted into a slot of a stator core and configured by a full pitch winding implementing 6 pitches of 3 phases and 2 in parallel, the pitch being a distance between adjacent slots, characterized in that:
   first to fourth layers are formed in the slot of the stator core in a radial direction of the stator core; and
   when a first layer or a fourth layer is set as a draw out part of one phase in an optional reference slot, a first draw out of a different phase is formed in a draw out slot having 16 pitches in a slot forward direction in a same layer based on the reference slot, and a second draw out of the different phase is formed in a draw out slot having 32 pitches in the slot forward direction in the same layer based on the reference slot.

2. The stator winding pattern of a hairpin drive motor of claim 1, wherein
   neutral point draw out parts of three phases are formed in the first layer by the draw out part of the one phase,
   a first neutral point draw out part of the different phase is formed in the draw out slot having 16 pitches in the slot forward direction based on a neutral point draw out part of the one phase, and
   a second neutral point draw out part of the different phase is formed in the draw out slot having 32 pitches in the slot forward direction.

3. The stator winding pattern of a hairpin drive motor of claim 2, wherein
   the neutral point draw out parts of the three phases are formed in the fourth layer by the draw out part of the one phase,
   the first neutral point draw out part of the different phase is formed in the draw out slot having 16 pitches in the slot forward direction, and
   the second neutral point draw out part of the different phase is formed in the draw out slot having 16 pitches in a slot reverse direction.

4. A stator winding pattern of a hairpin drive motor including a stator with 8 poles and 48 slots of a distribution winding where a hairpin-type flat coil is inserted into a slot of a stator core and configured by a full pitch winding implementing 6 pitches of 3 phases and 2 in parallel (U1, U2/V1, V2/W1, and W2), the 48 slots being referred to as first to 48th slot in a forward direction, characterized in that:
   first to fourth layers are formed in the slot of the stator core in a radial direction of the stator core; and
   when a fourth layer of a 16th slot is set as a U1 draw out part, a V1 draw out part is formed in a fourth layer of a 32nd slot, a W1 draw out part is formed in a fourth layer of a 48th slot, a U2 draw out part is formed in a first layer of a 14th slot, a V2 draw out part is formed in a first layer of a 30th slot, and a W2 draw out part is formed in a first layer of a 46th slot.

5. The stator winding pattern of a hairpin drive motor of claim 4, wherein
neutral point draw out parts of three phases U1, V1, and W1 are formed in the first layer by the U1 draw out part, and
the U1 neutral point draw out part is formed in a first layer of an 8th slot, the V1 neutral point draw out part is formed in a first layer of a 24th slot, and the W1 neutral point draw out part is formed in a first layer of a 40th slot.

6. The stator winding pattern of a hairpin drive motor of claim 5, wherein
neutral point draw out parts of the three phases U2, V2, and W2 are formed in the fourth layer by the U1 draw out part, and
the U2 neutral point draw out part is formed in a fourth layer of a 22nd slot, the V2 neutral point draw out part is formed in a fourth layer of a 38th lot, and the W2 neutral point draw out part is formed in a fourth layer of a 6th slot.

* * * * *